UNITED STATES PATENT OFFICE.

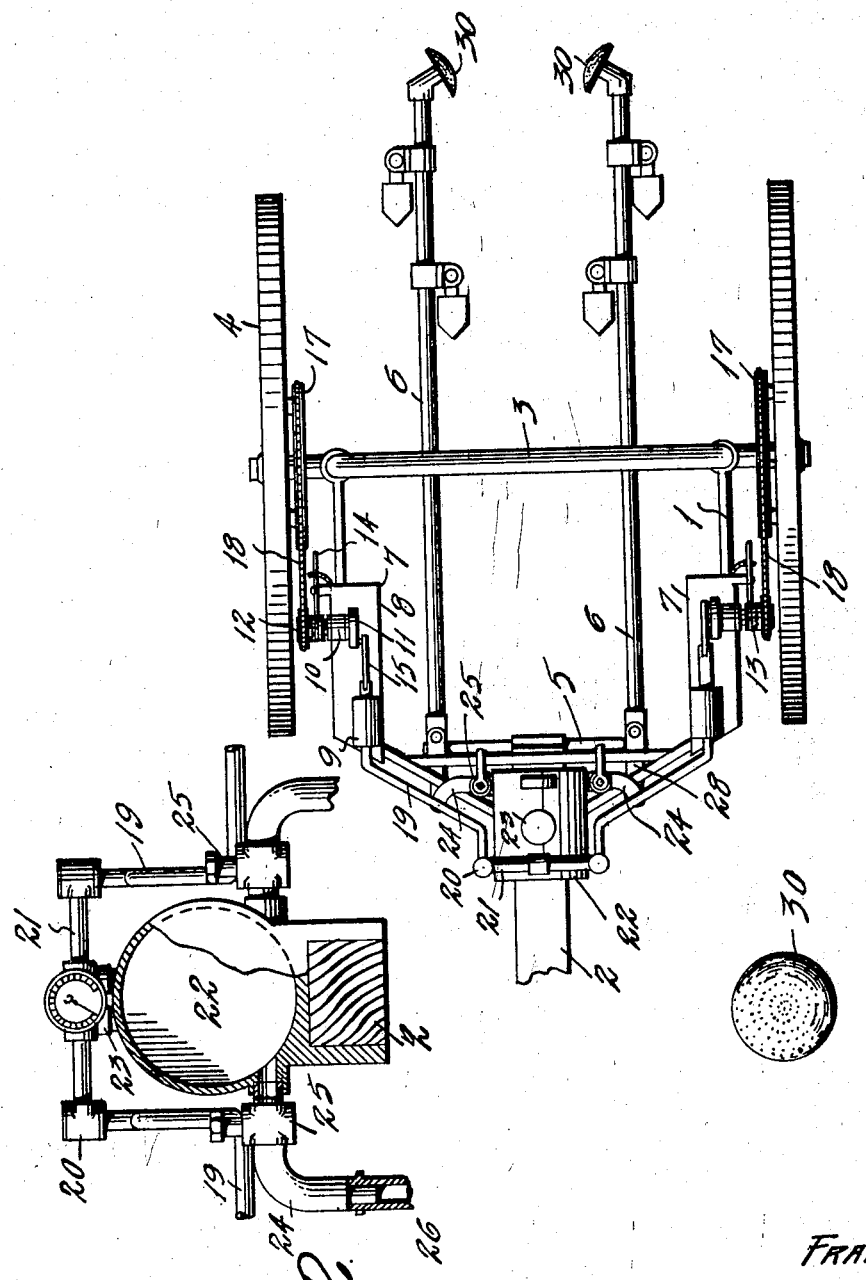

FRANK OLDHAM, OF DALLAS, TEXAS.

SPRAYING ATTACHMENT FOR CULTIVATORS.

1,156,622.   Specification of Letters Patent.   Patented Oct. 12, 1915.

Application filed June 1, 1915. Serial No. 31,327.

*To all whom it may concern:*

Be it known that I, FRANK OLDHAM, citizen of the United States, residing at Dallas, in the county of Dallas and State of Texas, have invented certain new and useful Improvements in Spraying Attachments for Cultivators, of which the following is a specification.

This invention pertains to new and useful improvements in spraying attachments for cultivators.

The object of the invention is to provide a spraying attachment constructed to be operated in connection with the gangs of a cultivator and employing the same as supports or conductors of the spraying liquid from the tank to the nozzles; together with means operated by the cultivator wheels for placing the spraying liquid under pressure, and means for conveying it to the gangs.

A still further object of the invention is to provide a device of the character described that will be strong, durable, efficient, and simple and comparatively inexpensive to construct, also one in which the several parts will not be likely to get out of working order.

Figure 3:
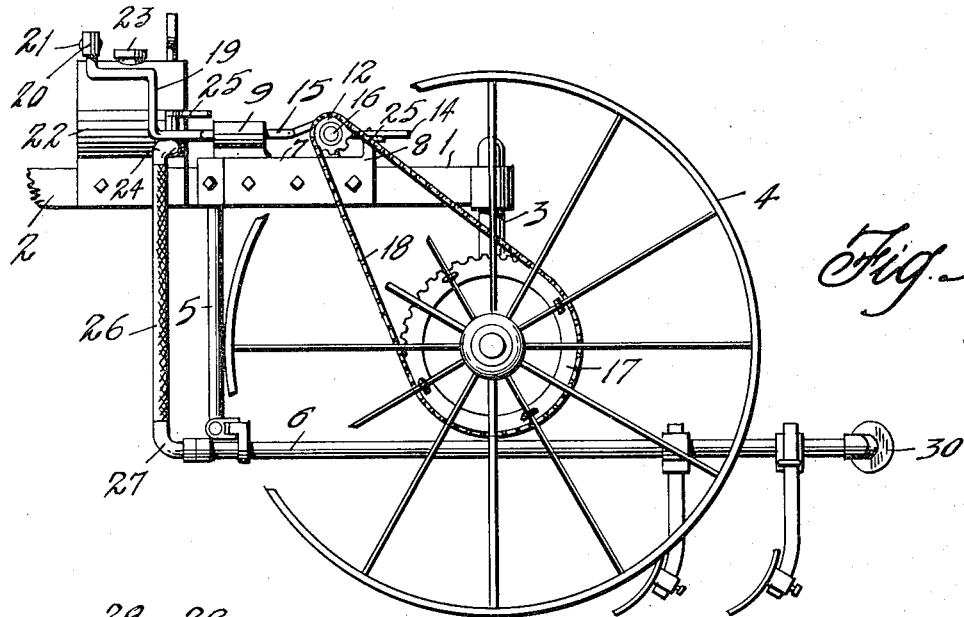
Figure 4:
Figure 5:
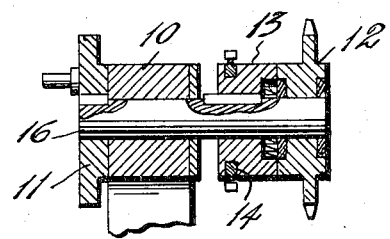
Figure 6:
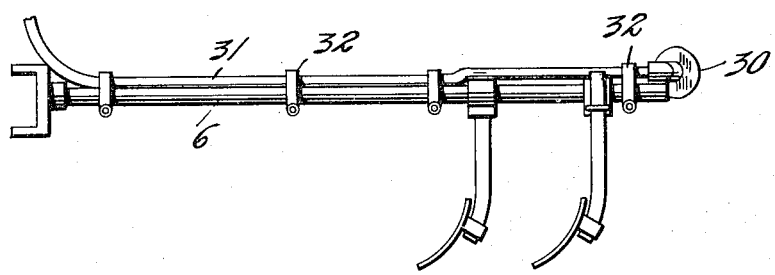

With the above and other objects in view the invention has relation to certain novel features of construction and operation, an example of which is described in the following specification and illustrated in the accompanying drawings, wherein:

Figure 1 is a plan view showing the invention attached to a cultivator, Fig. 2 is a detail partially in section, of the tank and connections, Fig. 3 is a side elevation of the parts shown in Fig. 1, Fig. 4 is a sectional detail of the hose coupling, Fig. 5 is a sectional detail of the clutch mechanism, Fig. 6 is an elevation of a cultivator gang showing a modified form of the invention, and Fig. 7 is an elevation of one of the nozzles.

In the drawings the numeral 1 designates the frame of a cultivator, 2 the tongue, 3 the arch axle and 4, the ground wheels supporting the axle. Gangs 6 of the tubular type are hinged to the usual arch-yoke 5 which is suspended from the frame. The details of construction of the cultivator have not been shown, but merely the main parts have been illustrated.

On each side of the frame air compressor plants 7 are mounted and each comprises a base plate 8 on which is mounted an air pump 9, bearing bracket 10 and clutch lever 14. In the bracket of each plant as is best shown in Fig. 5, a shaft 16 is journaled. On the inner end of the shaft a disk 11 is keyed; while on the opposite side of the bracket a clutch collar 13 is splined on the shaft and rotatively confined in the forked end of the lever 14 by which said collar may be moved into and out of engagement with the clutch hub of a sprocket wheel 12 loosely confined on the shaft. Each pump is driven by link 15 eccentrically connected with the correlated disk.

On each wheel 4 a sprocket ring 17 is secured and by means of a sprocket chain 18 drives one of the sprocket wheels 12. By operating the clutch levers 14 either plant may be operated or not as desired. The pump cylinders are of suitable construction and are connected by pipes 19 with check valves 20 mounted on the ends of a T-head 21 carried on a fluid tank 22 secured on the tongue 1. The tank is adapted to have introduced therein a suitable spraying fluid by removing a cap 23. The pumps force air into the tank whereby the fluid is placed under pressure.

As shown best in Fig. 2 distributing pipes 24 lead from opposite sides of the tank and are turned down over the frame 1. Controlling valves 25 are mounted in the pipes 24. To the lower end of each pipe a flexible pipe or hose 26 is secured and has connection at its lower end with an elbow 27, the latter carrying a coupling 29 which is screwed on a sleeve 28 attached to the forward end of one of the gangs 6. The hose 26 permits a free adjustment of the gangs. On the rear end of each gang 6 a nozzle 30 is mounted, said nozzles being so disposed as to direct their spray on the plants as the gangs pass on each side of same. It is obvious that the pumps being operated by the chain and sprocket mechanism and air forced into the tank 22, the fluid in the tank will be forced out through the pipes 24 when the valves 25 are opened. The fluid is conveyed by the hose 26 to the elbows 27 and by them into the tubular gangs 6 from which it is sprayed by the nozzles 30. It is obvious that as the plants are cultivated that are at the same time sprayed and insects destroyed or dispersed.

The invention is contemplated as a cultivator attachment and where tubular gangs are present these are utilized as conductors for the fluid, but where solid gangs are encountered a conducting pipe 31 as shown in Fig. 6 is secured on each gang by clips 32 and the nozzle placed on the end of this pipe.

The invention is presented as including such modifications and alterations as properly come within the scope of the appended claims.

What I claim, is:

1. The combination with the frame, ground wheels and gangs of a cultivator; of a spraying attachment comprising, a tank mounted on the frame, an air compressor plant mounted on the frame and having operative connection with one of the ground wheels, an air line connection between the said plant and the tank, a fluid conveying connection extending from the tank and including a flexible element, and a nozzle mounted at the rear end of one of the gangs, the gang having provision for conveying the fluid from the conveying connection to the nozzle.

2. The combination with the frame, ground wheels and gangs of a cultivator; of a spraying attachment comprising, a fluid tank mounted on the frame, an air compressor plant mounted on the frame and having operative connection with one of the wheels of the cultivator, an air line connection between the plant and the tank, a fluid conveying connection leading from the tank and including a flexible element, and a nozzle mounted on the rear end of one of the gangs and having fluid connection with the conveying connection.

3. The combination with the frame, ground wheels and the tubular gangs of a cultivator; of a spraying attachment comprising, a fluid tank mounted on the frame, an air compressor plant mounted on the frame and driven by one of the ground wheels, an air pipe leading from the plant to the tank and including a check valve, a distributing pipe extending from the tank and directed downward, a flexible pipe secured to the distributing pipe, an elbow coupled with the flexible pipe, said elbow being attached to forward end of one of the tubular gangs, and an inwardly directed nozzle mounted on the rear end of said gang.

In testimony whereof I affix my signature.

FRANK OLDHAM.